United States Patent
Karl et al.

(10) Patent No.: US 8,031,927 B2
(45) Date of Patent: *Oct. 4, 2011

(54) MEDICAL IMAGE PROCESSING

(75) Inventors: William C. Karl, Andover, MA (US);
Zhuangli Liang, Brighton, MA (US);
Homer Pien, Andover, MA (US);
Thomas J. Brady, Winchester, MA (US)

(73) Assignee: The General Hospital Corporation, Boston, MA (US)

( * ) Notice: Subject to any disclaimer, the term of this patent is extended or adjusted under 35 U.S.C. 154(b) by 930 days.

This patent is subject to a terminal disclaimer.

(21) Appl. No.: 11/320,153

(22) Filed: Dec. 28, 2005

(65) Prior Publication Data

US 2007/0147672 A1    Jun. 28, 2007

(51) Int. Cl.
*G06K 9/00* (2006.01)
(52) U.S. Cl. ......... 382/131; 382/130; 382/132; 382/254
(58) Field of Classification Search .................. 382/128, 382/254, 130, 131, 132; 345/424; 378/8, 378/4
See application file for complete search history.

(56) References Cited

U.S. PATENT DOCUMENTS

| | | | | |
|---|---|---|---|---|
| 7,283,604 B2* | 10/2007 | De Man et al. | | 378/4 |
| 7,372,937 B2* | 5/2008 | Wang et al. | | 378/16 |
| 7,394,923 B2* | 7/2008 | Zou et al. | | 382/131 |
| 7,444,011 B2* | 10/2008 | Pan et al. | | 382/131 |
| 7,646,898 B1* | 1/2010 | Nowinski et al. | | 382/128 |
| 7,689,017 B2* | 3/2010 | Karl et al. | | 382/128 |
| 2002/0070970 A1 | 6/2002 | Wood et al. | | |
| 2003/0091142 A1* | 5/2003 | Li | | 378/8 |
| 2003/0215124 A1* | 11/2003 | Li | | 382/131 |
| 2006/0098010 A1* | 5/2006 | Dwyer et al. | | 345/424 |

FOREIGN PATENT DOCUMENTS

EP    0434872    7/1991

OTHER PUBLICATIONS

Liang et al., "Image Enhancement in Detection of Coronary Stenosis Using MDCT", Poster Posted at National Science Foundation Visit 2005 at Northeastern University, Boston, MA, Apr. 7-8, 2005, 1 page.
Saleh et al., "Center for Subsurface Sensing & Imaging Systems", Research Overview Presentation at National Science Visit 2006 at Northeastern University, Boston, MA, Apr. 4-6, 2006, 52 pages.
Liang et al., "Image Enhancement in Detection of Coronary Stenosis Using MDCT", Poster Posted at National Science Foundation Visit 2006 at Northeastern University, Boston, MA, Apr. 4-6, 2006, 1 page.
Karl, "Fusing Multi-Modality Inverse Data Through Shared Boundary Structure", presented at National Science Foundation Visit 2006 at Northeastern University, Boston, Ma, Apr. 6, 2006, 14 pages.
American Heart Association. Heart Disease and Stroke Statistics—2003 Update, Dallas, TX: American Heart Association, 2003, 46 pages.

(Continued)

*Primary Examiner* — Wesley Tucker
(74) *Attorney, Agent, or Firm* — Quarles & Brady LLP

(57) ABSTRACT

In one aspect, the invention is a method of medical image processing. The method includes receiving data representing a medical image. The method also includes generating the medical image based on a model. The model characterizes the medical image as a composition of at least two components having processing constraints.

24 Claims, 3 Drawing Sheets

OTHER PUBLICATIONS

Chandrasekar et al., "Complications of Cardiac Catheterization in the Current Era: A single-Center Experience" Catheter Cardiovas. Interv. 2001;52:289-95.
Thompson et al., "Imaging of Coronary Calcification by Computed Tomography" J. Magn. Reson. Imaging. 2004; 19:720-33.
Barrett et al., "Artifiacts in CT: Recognition and Avoidance", Radiographics 2004;24:1679-91.
DeMan et al., "Metal Streak Artifacts in X-Ray Computed Tomography: A Simulation Study", IEEE Trans. Nuclear Sci. 1999;46:691-696.
Nakanishi et al., "Pitfalls in 16-Detector row CT of the Coronary Arteries", Radiographics 2005;25:425-38.
Glover, et al., "An Algorithm for the Reduction of Clip Artifacts in CT Reconstructions", Med. Phys. 1981;8:799-807.
Kalender et al., "Reduction of CT Artifacts Caused by Metallic Implants", Radiology 1987;164:576-7.
Kacheiriess, et al., "Generalized Multi-Dimensional Adaptive Filtering for Conventional and Spiral Single-Slice, Multi-Slice, and Cone-Bean CT", Med. Phys. 2001;28:475-90.
Watzke O. Kalender WA. A Pragmatic Approach to Metal Artifact Reduction in CT: Merging of Metal Artifact Reduced Images, Eur. Radiol. 2004:14:849-56.
Wang et al., "Iterative Deblurring for CT Metal Artifact Reduction", IEEE Transactions on Medical Imaging 1996;15:657-664.
Wang et al., "Local Computed Tomography via Iterative Deblurring", Scanning 1996;18:582-8.
Robertson et al., "Total Hip Prosthesis Metal-Artifact Suppression Using Iterative Deblurring Reconstruction", J. Comput. Assist. Tomogr. 1997;21:293-8.
Williamson et al., "Prospects for Quantitative Computed Tomography Imaging In the Presence of Foreign Metal Bodies Using Statistical Image Reconstruction", Med. Phys. 2002;29:2404-18.
Wang et al., "Fast Iterative Algorithm for Metal Artifact Reduction in X-ray CT", Acad. Radiol. 2000;7:607-14.
Wang et al., "Iterative X-Ray Cone-Beam Tomography for Metal Artifact Reduction and Local Region Reconstruction", Microscopy and Microanalysis 1999;5:58-65.
Nuyts et al., "Iterative Reconstruction for Helical CT: A Simulation Study", Phys. Med. Biol. 1998;43:729-37.
De Man et al., "An Iterative Maximum-Likelihood Polychromatic Algorithm for CT", IEEE Trans. Med. Imaging 2001;20:999-1008.
Sakai et al., "The Use of Deblurring Technique for Improving the Longitudinal Resolution in Helical CT of the Head and Neck Region", Comput. Med. Imaging Graph 1997;21:153-64.
Jiang et al. "Blind Deblurring of Spiral CT Images-Comparative Studies on Edge-To-Noise Ratios", Med. Phys. 2002;29:821-9.
Jiang et al., "Blind Deblurring of Spiral CT Images", IEEE Trans. Med. Imaging 2003;22:837-45.
Wang et al., "Spiral CT Image Deblurring for Cochlear Implantation", IEEE Trans. Med. Imaging 1998;17:251-62.
Rollano-Hijarrubia et al., "Improving the Imaging of Calcifications in CT by Histogram-Based Selective Deblurring", Proceedings of the SPIE Conference on Medical Imaging 2005,12 pages.
Osher et al., "Image Decomposition and Restoration using Total Variation Minimization and the H-1 Norm", Multiscale Model. Simul. 2003;1:349-370.
Vese et al., "Modeling Textures with Total Variation Minimization and Oscillating Patterns in Image Processing", Journal of Scientific Computing 2003:19.
Bertalmio et al., "Simultaneous Structure and Texture Image Inpainting", IEEE Trans. Image Proc. 2003;12:882-889.
Vese, "Image Denoising and Decomposition with Total Variation Minimization and Oscillatory Functions", Journal of Mathematical Imaging and Vision 2004;20:7-18.
Donoho et al., "Maximum Entropy and the Nearly Black Object", J.R. Statist. Soc. 1992; B54:41-81.
Donoho, David L., "Superresolution via Sparsity Constraints", SIAM J. Math. Anal. 1993;23:1309-1331.
Gauch, et al., "Hybrid Boundary-Based and Region-Based Deformable Models for Biomedical Image Segmentation", SPIE Mathematical Methods in Medical Imaging III 1994;2299:72-83.
Gauch, et al., "Hybrid Deformable Models for Three-Dimensional Biomedical Image Segmentation", IEEE Proc. Nuclear Science and Medical Imaging 1994;4:1935-1939.
Pien, et al., "Variational Segmentation of Multi-Channel MRI Images", IEEE Int'l Conf. Image Processing 1994;3-508-512.
Pien, et al. "A Variational Approach to Multi-Sensor Fusion of Images", Int'l J. Applied Intelligence 1995;5:217-235.
Tari, et al., "A Computationally Efficient Shape Analysis Via Level Sets", IEEE Mathematical Methods in Biomedical Image Analysis 1996:234-243.
Shah, et al., "Recovery of Surfaces with Discontinuities by Fusing Shading and Range Data Within a Variational Framework", IEEE Trans. Image Processing 1996;5:1243-1251.
Tari, et al., "Extraction of Shape Skeletons from Grayscale Images", Computer Vision and Image Understanding 1997;66:133-146.
Pien, et al., "Segmentation of MR Images Using Curve Evolution and Prior Information", Int'l Journal of Pattern Recognition and Artificial Intelligence 1997;11:1233-1245.
Bhatia, et al., "A Wavelet-Based Method for Multiscale Tomographic Reconstruction", IEEE Transactions on Medical Imaging 1996;15:92-101.
Fosgate, et al., "Multiscale Segmentation and Anomaly Enhancement of SAR Imagery", IEEE Transactions on Image Processing Special issue on Automatic Target Recognition 1997;6:7-20.
Bhatia, et al., "Tomographic Reconstruction and Estimation Based on Multiscale Natural-Pixel Bases", IEEE Transactions on Image Processing special issue on Automatic Target Recognition 1997;6:463-478.
Kaufhold, et al., "A Statistical Method for Efficient Segmentation of MR Imagery", Int'l Journal of Pattern Recognition and Artificial Intelligence Special issue on Processing of MRI Imagery 1997;11:1213-1231.
Kaufhold, et al., "A Texture-Based Variational Segmentation Method for Ultrasound Blood Vessel Imagery", Abstract, Annals of Biomedical Engineering 1998;26.
Schneider, et al., "Multiscale Methods for the Segmentation and Reconstruction of Signals and Images", IEEE Transactions on Image Processing special issue on Automatic Target Recognition 2000;9:456-468.
Chan, et al., "A New Model-Based Technique for Enhanced Small-Vessel Measurements in X-Ray Cine-Angiograms", IEEE Transactions on Medical Imaging 2000;19:243-255.
Feng, et al., "A Curve Evolution Approach to Object-Based Tomographic Reconstruction", IEEE Transactions on Image Processing special issue on Automatic Target Recognition 2003;12:44-57.49.
Desai et al., "Functional MRI Activity Characterization Using Response Time Shift Estimates from Curve Evolution", IEEE Transactions on Image Processing, 2002;21:1402-1412.
Galdi, et al., "Moderately Rough Surface Underground Imaging via Short-Pulse Quasi-Ray Gaussian Beams", IEEE Transactions on Antennas and Propagation 2003;51:2304-2318.
Cetin, et al., "Feature Enhancement and ATR Performance Using Nonquadratic Optimization-Based SAR Imaging", IEEE Trans Aerospace and Electronic Systems 2003;39:1375-1395.
Weisenseel, et al., "A Variational Approach to Multi-Modality Subsurface Data Inversion and Fusion Based on Shared Image Structure", Subsurface Sensing Technologies and Applications 2003;4:375-394.
Karl, et al., "Capabilities and Limitations of Pupil-Plane Filters for Superresolution and Image Enhancement", Opt. Express 2004;12:4150-4156.
Chan, et al., "OCT-Based Arterial Elastography: Robust Estimation Exploiting Tissue Biomechanics", Optics Express 2004;12:4558-4572.
Perkins et al., "DE Report UCRL-ID117796, ENDL Type Formats for the LLNL;Evaluated Atomic Data Library (EADL), Evaluated Electron Data Library EEDL, and Evaluated Photon Data Library (EPDL)", Univ. of California, 32 Pages.

Cetin, et al., "Feature-Enhanced Synthetic Aperture Radar Image Formation Based on Nonquadratic Regularization", IEEE Transactions on Image Processing special issue on Automatic Target Recognition 2001;10:623-631.

Cetin, et al., "Superresolution and Edge-Preserving Reconstruction of Complex-Valued Synthetic Aperture Radar Images", IEEE Int'l Conf. on Image Processing, Vancouver, British Columbia, Canada, 2000:701-704.

Notification of transmittal of the International Search Report and the Written Opinion of the International Searching Authority, or the Declaration. (Form PCT/ISA/220), 2 pages, Apr. 24, 2007.

International Search Report. (Form PCT/ISA/210), 4 pages.

Written Opinion of the International Searching Authority. (Form PCT/ISA/237), 5 pages.

* cited by examiner

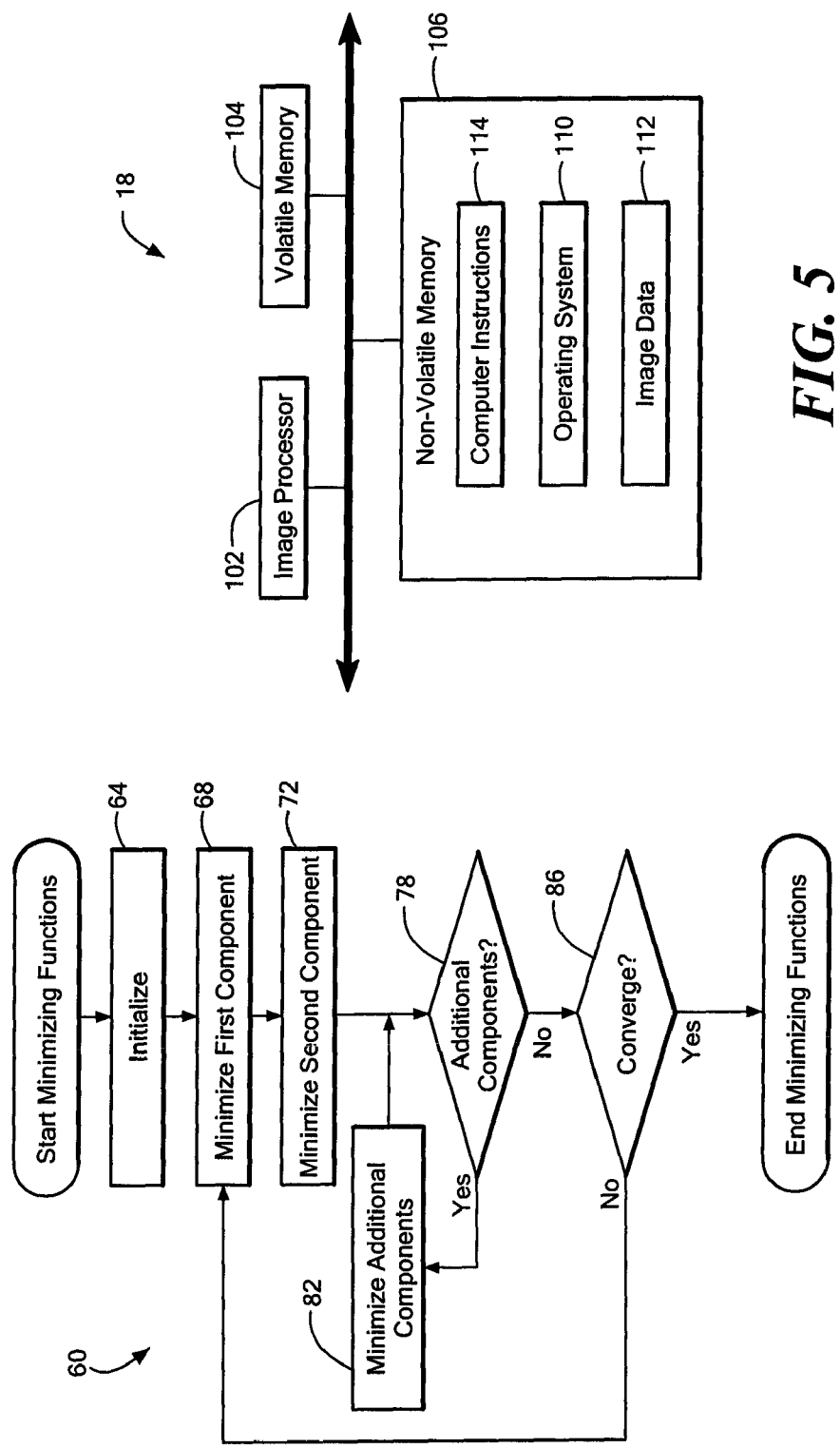

MEDICAL IMAGE PROCESSING

TECHNICAL FIELD

This invention relates generally to image processing and more specifically to medical images.

BACKGROUND

There are a number of systems used for generating medical images. For example, a computed tomography (CT) system generates three-dimensional (3-D) images by generating a series of two-dimensional (2-D) X-ray images about an axis of rotation. In another example, a positron emission tomography (PET) system measures positron emissions from human tissue as a result of absorption of a radioactive molecule injected in to a human body. Other medical imaging systems include a magnetic resonance imaging system (MRI) which generates images by applying magnetic fields and radio frequency (RF) energy to the human body and recording the resultant effects on the nuclei in the human tissue.

SUMMARY

In one aspect, the invention is a method of medical image processing. The method includes receiving data representing a medical image and generating the medical image based on a model. The model characterizes the medical image as a composition of at least two components having processing constraints.

In another aspect, the invention is an apparatus. The apparatus includes a memory that stores executable instructions for medical image processing. The apparatus also includes a processor that executes the instructions to receive data representing a medical image and to generate the medical image based on a model, the model characterizing the medical image as a composition of at least two components having processing constraints.

In a further aspect, the invention is an article. The article includes a machine-readable medium that stores executable instructions for medical image processing. The instructions cause a machine to receive data representing a medical image and to generate the medical image based on a model, the model characterizing the medical image as a composition of at least two components having processing constraints.

DESCRIPTION OF THE DRAWINGS

FIG. 4 is a flowchart for a process of minimizing total energy functional across all image components.

FIG. 5 is a diagrammatic view of a computer system on which the processes of FIG. 3 and FIG. 4 may be implemented.

DETAILED DESCRIPTION

A key problem in medical imaging is the removal of artifacts which degrade the quality of the image for diagnostic purposes. To address this problem, described herein is a model-based approach to image processing wherein the structures or areas of interest in the image are explicitly partitioned according to their behavior and different constraints are imposed separately on each structure or area. This approach can be employed as either a post-processing (restoration) method or as an image formation (reconstruction) method. This approach differs considerably from conventional deblurring and filtered back projection reconstruction techniques. To partition the image structures significant features of the different structures are used. These are flexible, but could include characteristics such as smoothness, concentration of energy or brightness, intensity, etc. A single functional or energy is then defined which combines all these model elements. The minimum of this combined energy is then sought.

While the system and techniques described herein uses an embodiment that includes computed tomography (CT), the system and techniques are not limited to CT. For example the system and techniques may be used in any image processing or acquisition system such as a magnetic resonance imaging (MRI) system, a positron emission tomography (PET) system, ultrasound and so forth. While the system and techniques described herein are used for image processing to detect calcium in an artery, the system may be used in any image processing system such as to minimize blurring or blooming effects between any different materials. The method described herein uses two components to distinguish between materials, but the method may be used with any number of components.

Figure 1:
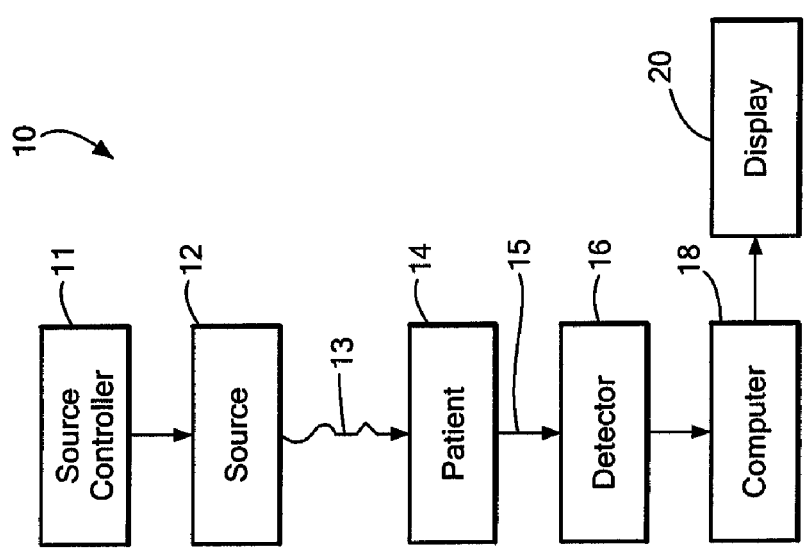
FIG. 1 is a diagrammatic view of a computed tomography (CT) system.

Referring to FIG. 1, a computed tomography system 10 includes an x-ray source 12, a patient 14, a detector 16, a computer 18 and a display 20. The X-ray source 12 emits an x-ray beam 13 which impinges upon or illuminates a portion (sometimes referred to as a slice) of patient 14. Portions of the x-ray beam are absorbed by structures within the patient (both physiological and non-physiological structures) and a portion of the beam 15 reached a detector 16. Detector 16 measures the absorption along numerous paths with both radial and tangential components. The computer 18 uses the measured absorption information collected by the detector 16 to form a cross-sectional image, which may be viewed on display 20.

Figure 2A:
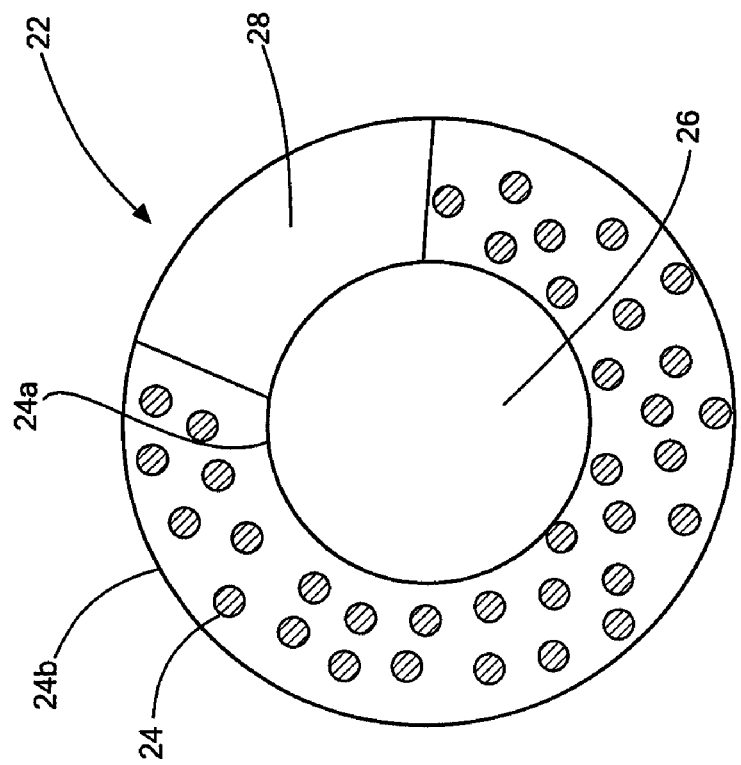
FIG. 2A is a diagrammatic view of an artery having calcification.
Figure 2B:
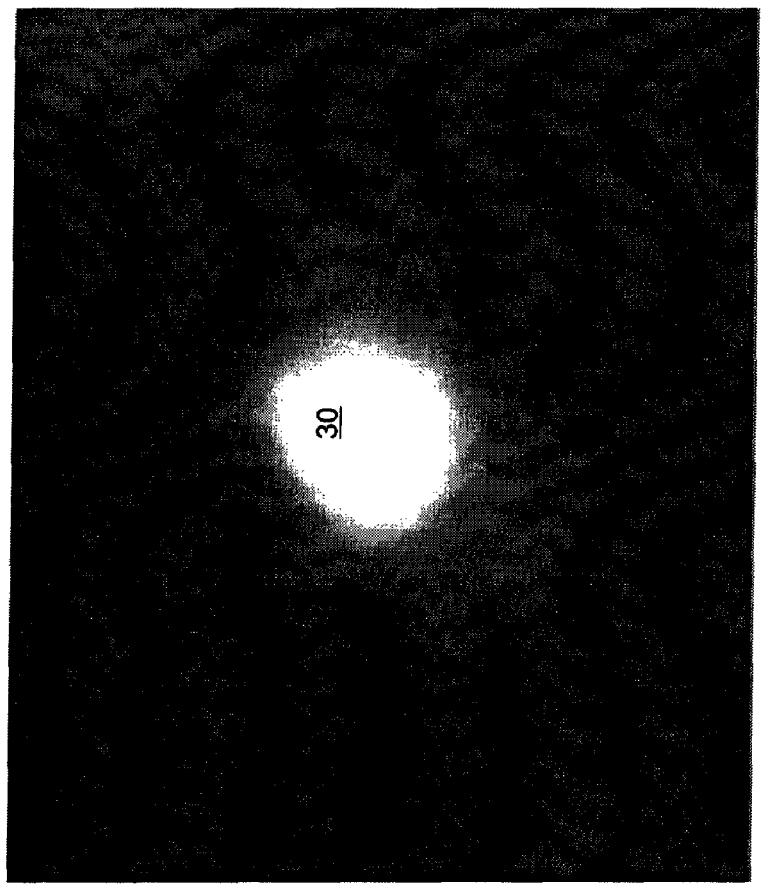
FIG. 2B is a CT image of the artery.

Referring to FIGS. 2A and 2B, an artery 22 includes a wall 24 having an inner wall portion 24a and an outer wall portion 24b. Inner wall portion 24a defines, a lumen 26. A portion of wall 24 may include a calcified region 28. Referring briefly to FIG. 2B, a CT image 30 of an artery similar to artery 22 (FIG. 2A) is shown. CT image 30 is provided using known image processing techniques. Despite the well-localized nature of the calcium region 28, the resulting image 30 shows nearly total obscuration of the luminal region 26, rendering the image 30 non-evaluable. A calcium artifact in coronary CT arises when the intensity of small dense calcium regions in the vessel wall spills into adjacent pixels due to the blurring induced by the resolution-limited image formation process. The CT system 10 together with the reconstruction process spreads the intensity of such calcified regions over the image, resulting in an over-representation of the size of the calcification ("calcium blooming") and often an under-representation of the size of the lumen 26. In this sense, the "blooming" effect is intrinsic to any imaging modality in which the point-spread function is of a scale comparable to the size of the objects that are of interest, and the field of view may contain bright objects which, due to the point-spread function, obscures nearby lower-intensity objects of interest.

Figure 3:
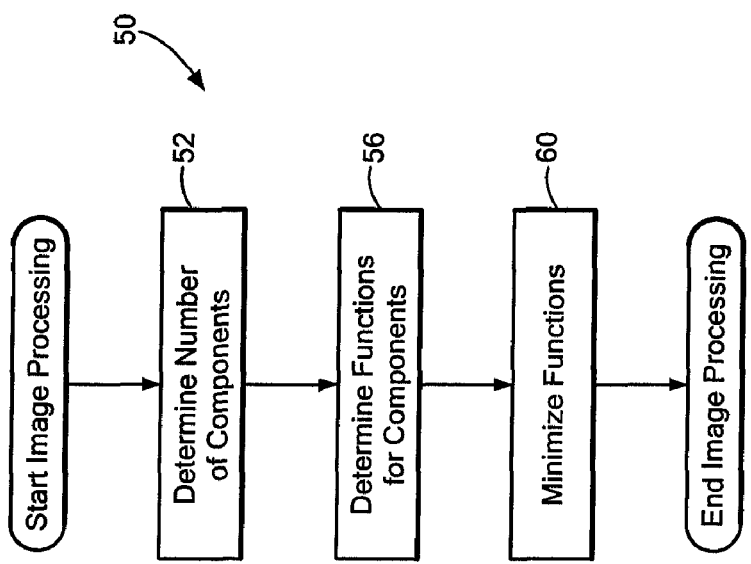
FIG. 3 is a flowchart for a process of processing an image.

Turning now, to FIG. 3, an image processing technique (e.g., a process 50) which may be performed, for example, by computer 18. The image processing described in FIG. 3 may be performed at post-processing, for example, after filtered back projection processing or with no image pre-processing.

Process 50 assumes an underlying desired ideal image f exists and that f is composed of multiple components as determined by the user or operator. Process 50 determines the number of components (52). The number of such components depends on factors including the complexity of the anatomy or object to be imaged, the degree to which a priori models exist for each component, and the resulting computational complexity. In the case of imaging an artery having a calcified portion, for example, one simple scenario is to model the ideal image f as the sum of two components: a calcium components $f_c$, and a non-calcified structured components $f_s$, so that $$f=f_c+f_s.$$

Process 50 determines functions for each of the components identified in processing block 56. For example, $f_s$, is assumed to have a behavior having a lower amplitude and greater spatial extent than $f_c$.

Corresponding to the ideal image f is a set of observed data g. The observed data g may be an image formed using standard techniques (e.g., back filter projection), which exhibit calcium blooming or the data could be raw data, which corresponds to a set of tomographic projections obtained prior to image formation.

H denotes an image blurring operator that maps the ideal image f to a set of observed data g. Thus, in an example using an image formed using standard techniques, H represents convolutional blurring with the point spread function corresponding to the imaging process. In some embodiments, a filtered back projection generated image may be approximated as being shift invariant and convolutional. In another example, using raw data, H represents the tomographic projection process. The operator H may be linear, though this is not essential. An enhanced estimate of the ideal image by minimization of an energy function may be represented as:

$$\hat{f} = \arg\min_{f} E_d(g, f) + \alpha_s E_s(f_s) + \alpha_c E_c(f_c)$$

where E denotes the "component energy", d denotes the data term, and $\alpha_s$, and $\alpha_c$ are positive weights balancing the contributions of the different terms. The three terms capture the imaging process and the behavior of the underlying image. The term $E_d(f, g)$, represents the data generation process H and ensures fidelity to the observations. A common choice in the image processing literature is to set this term to the negative log likelihood of data. If the observations are assumed conditionally Gaussian, then:

$$E_d(f,g)=\|g-Hf\|_2^2$$

In other examples, a Poisson observation model may be used.

The term $E_s(f_g)$ represents the behavior of the non-calcified tissue image. Since it is assumed that the non-calcium image is somewhat smooth, then $$E_s(f_s)=\|Df_s\|_2^2$$

where D is a discrete approximation to a derivative operator. Since the non-calcium component is assumed to have a lower amplitude, then $f_s \leq T_s$, for a positive threshold $T_s$. In one embodiment, $T_s$ is about 0.05 times the density of water.

Finally, the term $E_c(f_c)$ represents the behavior of calcified regions in cardiac CT. With the assumption that calcium should be spatially localized, then the calcium distribution may be represented as:

$$E_c(f_c)=\|Df_c\|_p^p$$

where D is a discrete approximation to a derivative operator and $0 < p \leq 2$. Penalty, p, has localization and super-resolution ability when $p \approx 1$. In addition, under the assumption that the calcium component will generally be denser than non-calcific tissue, then $T_c \leq f_c$ for a positive threshold $T_c$. In one embodiment, $T_c$ is about 1.2 times the density of water.

In summary, a formulation for enhanced cardiac CT imaging is:

$$\hat{f} = \hat{f}_s + \hat{f}_c$$
$$= \arg\min_{f_s \leq T_s, f_c \geq T_c} \|g - H(f_s + f_c)\|_2^2 + \alpha_s \|Df_s\|_2^2 + \alpha_c \|Df_c\|_1^1$$

The formulation explicitly represents a single unified approach to calcium deblurring. The formulation may be readily extended to capture other effects, including Poisson observation models, additional field constraints, components for additional biological structures, etc.

Referring to FIGS. 3 and 4, process 50 minimizes the functions for the components using, for example, a process 60. In particular, the energy function are minimized with respect to the values of the components $f_s$ and $f_c$ across an image to obtain a reconstructed image with enhanced behavior (i.e., better image) than a standard filtered back projection image. Minimization for the optimal enhanced image may be conducted through a series of iterative steps, for example, using a block coordinate descent approach and defining an outer iteration, which alternatively minimizes with respect to the tissue components $f_s$ and $f_c$ while the other component is held fixed.

Referring now to FIG. 4, process 60 begins with an initialization as shown in processing block 64. For example, initializing $f_s^{(k)}$ where k=0. Process 60 minimizes the first component (68). For example, minimizing the calcium component:

$$\hat{f}_c^{(k+1)} = \arg\min_{f_c \geq T_c} \|g - H(f_s^{(k)} + f_c)\|_2^2 + \alpha_c \|Df_c\|_1^1$$

Process 60 minimizes the second component (72). For example, minimizing the non-calcified component:

$$\hat{f}_s^{(k+1)} = \arg\min_{f_s \leq T_s} \|g - H(f_c^{(k+1)} + f_s)\|_2^2 + \alpha_s \|Df_s\|_2^2$$

Each subminimization is solved using an algebraic reconstruction technique (ART)-like iteration. Such ART-like techniques are well-known to persons of ordinary skill in the art. Process 60 determines if there are additional components (78). If so, process 60 minimized the additional components (82). Process 60 determines if there is convergence (86).

In some embodiments, process 60 may be initialized with, for example, a filtered back projection based reconstruction to provide an initial estimate of $\hat{f}_s^{(0)}$.

FIG. 5 shows a computer 18 using process 50 including process 60. Computer 100 includes an image processor 102, a volatile memory 104, and a non-volatile memory 106 (e.g., hard disk). Non-volatile memory 106 stores operating system 110; image data 112; and computer instructions 114, which are executed by the image processor 102 out of volatile memory 104 to perform all or part of process 50 and process 60.

Processes 50 and 60 are not limited to use with the hardware and software of FIG. 5; it may find applicability in any computing or processing environment and with any type of machine that is capable of running a computer program. Processes 50 and 60 may be implemented in hardware, software, or a combination of the two. Processes 50 and 60 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processes 50 and 60 and to generate output information.

The system can be implemented, at least in part, via a computer program product (i.e., a computer program tangibly embodied in an information carrier (e.g., in a machine-readable storage device or in a propagated signal) for execution by, or to control the operation of, data processing apparatus (e.g., a programmable processor, a computer, or multiple computers)). Each such program may be implemented in a high level procedural or object-oriented programming language to communicate with a computer system. However, the programs can be implemented in assembly or machine language. The language may be a compiled or an interpreted language and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 80. Process 80 may also be implemented as a machine-readable storage medium, configured with a computer program, where upon execution, instructions in the computer program cause the computer to operate in accordance with process 50.

The processes described herein are not limited to the specific embodiments described herein. For example, the processes are not limited to the specific processing order of FIGS. 3 and 4. Rather, any of the blocks of FIGS. 3 and 4 may be re-ordered, combined, repeated or removed, as necessary, to achieve the results set forth above.

The system described herein is not limited to use with the hardware and software described above. The system can be implemented in digital electronic circuitry, or in computer hardware, firmware, software, or in combinations thereof.

Method steps associated with implementing the system can be performed by one or more programmable processors executing one or more computer programs to perform the functions of the system. All or part of the system can be implemented as, special purpose logic circuitry (e.g., an FPGA (field programmable gate array) and/or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

Elements of different embodiments described herein may be combined to form other embodiments not specifically set forth above. Other embodiments not specifically described herein are also within the scope of the following claims.

What is claimed is:

1. A method for producing a CT image comprising:
   acquiring CT data of a region-of-interest (ROI) of a subject, the ROI having constituent components with known characteristics;
   reconstructing the CT data into sub-images corresponding to each of the constituent components by iteratively minimizing a model that relates the acquired CT data to estimates of the sub-images and accounts for the known characteristics of the constituent components; and
   combining the reconstructed sub-images to produce the CT image.

2. The method as recited in claim 1 wherein constituent components include a non-calcium component and a calcium component.

3. The method as recited in claim 2 wherein the known characteristics of the calcium component include a limited spatial extent and increased density and the known characteristics of the non-calcium components include a wide spatial extent, increased smoothness, and decreased density.

4. The method as recited in claim 3 wherein the model employs a relationship:

$$\hat{f} = \hat{f}_S + \hat{f}_C = \arg\min_{f_S < T_S, f_C > T_C} \|g - H(f_S + f_C)\|_2^i + \alpha_S \|Df_S\|_2^j + \alpha_C \|Df_C\|_1^p$$

in which $\hat{f}$ denotes the CT image, $\hat{f}_s$ and $\hat{f}_c$ denote estimates of a calcium sub-image and a non-calcium sub-image, respectively, g denotes the acquired CT data, H denotes a projection matrix of a CT system, $f_s$ and $f_c$, denote the non-calcium and calcium component, respectively, D denotes a derivative operator, $\alpha_s$ and $\alpha_c$ denote weighting terms, $T_s$ and $T_c$ denote constraints for the non-calcium and calcium components, respectively, and i, j, and p are penalty terms.

5. The method as recited in claim 4 wherein the penalty i in the term $\|g-H(f_S+f_C)\|_2^i$ is substantially equal to two.

6. The method as recited in claim 4 wherein the penalty j in the term $\alpha_S \|Df_S\|_2^j$ is substantially equal to two and accounts for the wide spatial extent and increased smoothness of the non-calcium component and the constraint $T_S$ accounts for the reduced density of the non-calcium component.

7. The method as recited in claim 4 wherein the penalty p in the term $\alpha_C \|Df_C\|_1^p$ is substantially equal to one and accounts for the limited spatial extent of the calcium component and the constraint $T_c$ accounts for the increased density of the calcium component.

8. The method as recited in claim 1 wherein iteratively minimizing the model further includes:
   generating an estimate of a first sub-image corresponding to a first component by minimizing a first cost function in which an estimate of a second component is fixed; and
   generating an estimate of the second sub-image corresponding to the second component by minimizing a second cost function in which an estimate of the first component is fixed.

9. The method as recited in claim 8 wherein the fixed estimate of the second sub-component is generated by reconstructing the acquired CT data using filtered backprojection.

10. The method as recited in claim 8 wherein iteratively minimizing the model further includes repeatedly minimizing the first and second cost functions until a selected convergence between the estimates of the first and second sub-images is reached.

11. The method as recited in claim 8 wherein the first cost function employs the relationship:

$$\hat{f}_C^{(k+1)} = \arg \min_{f_C \geq T_C} \|g - H(f_S^{(k)} + f_C)\|_2^2 + \alpha_C \|Df_C\|_1^1$$

in which $\hat{f}_c$ denotes an estimate of the first sub-image, k denotes an index, g denotes the acquired CT data, H denotes a projection matrix of a CT system, $f_s^{(k)}$ denotes an estimate of the second component, $f_c$ denotes the first component, respectively, $\alpha_c$ denotes a weighting term, D denotes a derivative operator, and $T_c$ denotes a constraint for the first sub-image.

12. The method as recited in claim 8 wherein the second cost function employs the relationship:

$$\hat{f}_S^{(k+1)} = \arg \min_{f_S \leq T_S} \|g - H(f_C^{(k+1)} + f_S)\|_2^2 + \alpha_S \|Df_S\|_2^2$$

in which $\hat{f}_s$ denotes an estimate of the second sub-image, k denotes an index, g denotes the acquired CT data, H denotes a projection matrix of a CT system, $f_C^{(k+1)}$ denotes an estimate of the first component, $f_s$ denotes the first component, respectively, $\alpha_s$ denotes a weighting term, D denotes a derivative operator, and $T_s$ denotes a constraint for the second sub-image.

13. The method as recited in claim 8 wherein the first sub-image is a calcium sub-image and the second sub-image is a non-calcium sub-image.

14. The method as recited in claim 13 wherein the CT image has reduced calcium bloom artifacts.

15. The method as recited in claim 1 wherein iteratively minimizing the model includes employing a block coordinate descent technique.

16. The method as recited in claim 1 wherein the known characteristics include at least one of a spatial characteristic and a density characteristic.

17. The method as recited in claim 1 wherein the known characteristics of a first constituent component includes a limited spatial extent and increased density and the known characteristics of a second constituent components includes a wide spatial extent, increased smoothness, and decreased density.

18. A method for producing a medical image comprising:
acquiring image data of a region-of-interest (ROI) of a subject, the ROI having constituent components with known characteristics;
reconstructing sub-images corresponding to each of the constituent components by iteratively minimizing a model that relates the acquired image data to estimates of the sub-images and accounts for the known characteristics of the constituent components; and
combining the reconstructed sub-images to produce the medical image.

19. The method as recited in claim 18 wherein the medical image has a reduced level of bloom artifacts.

20. The method as recited in claim 18 wherein the image data is acquired using at least one of a CT system, MRI system, PET system, and ultrasound system.

21. The method as recited in claim 18 wherein the model employs the relationship:

$$\hat{f} = \hat{f}_S + \hat{f}_C = \arg \min_{f_S < T_S, f_C > T_C} \|g - H(f_S + f_C)\|_2^2 + \alpha_S \|Df_S\|_2^2 + \alpha_C \|Df_C\|_1^1$$

in which $\hat{f}$ denotes the medical image, $\hat{f}_s$ and $\hat{f}_c$ denote estimates of a first and second sub-image, respectively, g denotes the acquired image data, H denotes a system response of a medical imaging system, $\hat{f}_s$ and $\hat{f}_c$ denote the first and second components, respectively, D denotes a derivative operator, $\alpha_s$ and $\alpha_c$ denote weighting terms, and $T_s$ and $T_c$ denote constraints for the first and second components, respectively.

22. The method as recited in claim 18 wherein iteratively minimizing the model includes employing a block coordinate descent technique.

23. The method as recited in claim 18 wherein the known characteristics include at least one of a spatial characteristic and a density characteristic.

24. The method as recited in claim 18 wherein the known characteristics of a first constituent component includes a limited spatial extent and increased density and the known characteristics of a second constituent components includes a wide spatial extent, increased smoothness, and decreased density.

* * * * *